United States Patent Office 3,407,226
Patented Oct. 22, 1968

3,407,226
STEREOSPECIFIC SYNTHESIS OF AMINO ACIDS
John M. Chemerda, Plainfield, Edward W. Tristram, Cranford, and Roger J. Tull, Metuchen, N.J., assignors to Merck & Co., Inc., Rahway, N.J., a corporation of New Jersey
No Drawing. Filed Aug. 19, 1964, Ser. No. 390,501
15 Claims. (Cl. 260—519)

ABSTRACT OF THE DISCLOSURE

There is disclosed a series of 3-(hydroxyphenyl)-2-lower alkylserines of the 2S:3R configuration and a process for the preparation of these serines and L-3-(hydroxylated-phenyl)-2-lower alkylalanines. The process comprises treating a hydroxyphenylacylcarbinol with a cyanide and ammonium carbonate to form a 4-carbamoyl-4-lower alkyl - 5 - (hydroxylated - phenyl)-2-oxazolidinone in unequal isomer proportions. The isomers are separated by counter-current distribution and the 4S:5R isomer is isolated. Treatment of the oxazolidinone with a mineral acid provides the (2S:3R) - 3 - (hydroxylated-phenyl)-2-lower alkylserines and the treatment of the oxazolidinone with hydrogen iodide and red phosphorus yields the L-3-(hydroxylated-phenyl)-2-lower alkylalanines.

This invention relates to a new stereospecific method of synthesizing L-α-lower alkyl hydroxylated phenylalanines and (2S:3R) - 3 - (hydroxylated - phenyl)-2-lower alkyl-serines.

α-Lower alkyl hydroxylated phenylalanines and 3-(hydroxylated-phenyl)-2-lower alkylserines are inhibitors of mammalian decarboxylase. Compounds with such properties are useful in combinations for antihypertensives. Some of these types of compounds, e.g., α-methyl-3,4-dihydroxy alanines, are themselves potent antihypertensives. The physiological activity of these compounds, however, resides in only one stereoisomer. Consequently, syntheses which involve the resolution of the racemates at the end of the synthesis are wasteful, since the unused isomer is not easily racemized for recycling. There is a need for a synthesis of such compounds which produce mostly one isomer.

We have found that it is possible to prepare the desired isomer of each of the above types of compound in a predominant quantity from L-lower alkyl hydroxylated phenyl carbinols. These latter compounds are available by the incubation of hydroxylated-benzaldehydes with a yeast culture. Thus, one obtains 80% of the desired isomer by the process which is to be described, because the intermediates for both of these types of compound are formed in a ratio of about 80% of the desired stereo-isomer to 20% of the undesired compound.

The terminology used in describing these stereo-isomers in this specification is that used to describe absolute configuration. Since a center of optical activity is an asymmetric carbon having four different groups bound thereto, as one views the asymmetric carbon from the side away from the smallest group attached thereto, the terminology used to describe the isomer depends on whether the other three groups are arranged clockwise or counterclockwise in order of decreasing size. When the groups are clockwise, the configuration is referred to as rectus (R). When it is counterclockwise, it is referred to as sinister (S). The number preceding the letter indicates the carbon described. This terminology has been established in chemical literature and is therefore followed here.

The synthesis, as illustrated in the flow sheet for the simplest compounds of these types, the L-α-methyl-m-tyrosine and (2S:3R) - 3 - (3 - hydroxyphenyl)-2-methyl-serine, comprises as a first step the formation of an oxazolidinone by reaction of the carbinol with a water-soluble cyanide solution (such as sodium cyanide, potassium cyanide, ammonium cyanide and the like) and ammonium carbonate in an aqueous solution. The mixture is agitated until there is substantial formation of the oxazolidinone. Preferably, the mixture is heated mildly in order to lessen reaction time and to afford better mixing and solubility of the reactants.

The key to this invention is the fact that the oxazolidinone so formed, although having a new asymmetric carbon formed by the reaction, does not result in a 50—50 mixture of the possible isomers. Instead, the isomers are formed in the ratio of 80% 4S:5R to 20% 4R:5R. The 4S:5R isomer is readily separated, as will be described, and forms by further synthesis either the optically active L - α - methyl - m-tyrosine or the 3-(3-hydroxyphenyl)-2-methylserine. The chemistry involved in this synthesis is illustrated in the flow sheet.

The mixture of 4S:5R and 4R:5R oxazolidinones is isolated by dilution of the reaction mixture with a water-miscible organic liquid. The diluted mixture is filtered and the filtrate then evaporated. Preferably, the organic liquid used is ethanol. The dilution is usually made to a large volume, such as three to four times the original volume. It is also highly desirable to neutralize the reaction mixture at the same time by the addition of a limited amount of acid.

The isomers are separated by counter-current partition between ethyl acetate and water, by elution from an acidic resin with dilute acid, or by partition chromatography. The composition of fractions and the purity of the major isomer is determined by paper strip chromatography in a butanol-ammonia-water system. The product is isolated by evaporation of the solvent.

Depending on how this intermediate is treated, one obtains readily therefrom either the L-α-methyl-m-tyrosine or the 2S:3R-3-(3-hydroxyphenyl)-2-methylserine. When the oxazolidinone is heated at reflux with hydrogen iodide and red phosphorous in aqueous acetic acid, the tyrosine derivative is obtained. When a concentrated solution of hydrogen halide in water, such as hydrochloric acid or hydrobromic acid, is used at reflux, the final serine compound is obtained.

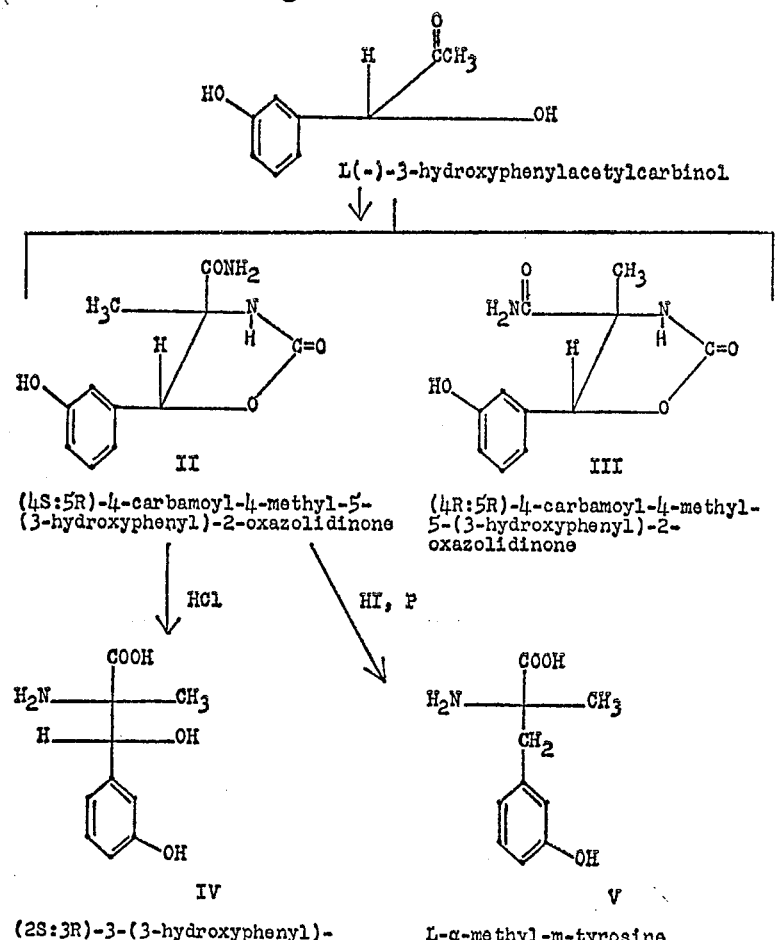

The above description and the flow sheet describe the process in terms of one of the simplest members of each series, namely the compounds having one hydroxyl in the meta position of the phenyl ring and methyls on the alpha carbon. The process, however, is usable to prepare the other compounds of the class. The phenyl ring may have one, two, or three hydroxyls in any position. The alpha carbon may have any lower alkyl, e.g., methyl, ethyl, propyl, isopropyl, butyl, isobutyl, and the like. Thus, for example, the phenylalanines preparable stereospecifically by this process include L-α-methyl-m-tyrosine, L-α-ethyl-m-tyrosine, L-α-methyl-p-tyrosine, L-α-methyl-3,4-dihydroxyphenylalanine, L-α-ethyl - 3,4 - dihydroxyphenylalanine, L-α-butyl - 3,4 - dihydroxyphenylalanine, L-α-methyl-2,3-dihydroxyphenylalanine, L-α-methyl - 2,4-dihydroxyphenylalanine, L-α-methyl - 2,5 - dihydroxyphenylalanine, L-α-methyl-3,5 - dihydroxyphenylalanine, L-α-methyl-2,4,5-trihydroxyphenylalanine, L - α - methyl-2,3,4 - trihydroxyphenylalanine, L-α-methyl-3,4,5-trihydroxyphenylalanine, and the like. The product obtained depends on the carbinol selected as the starting material, and this, in turn, depends on the hydroxylated-benzaldehyde, especially when α-methyl compounds are to be obtained.

Our invention can be illustrated by the following examples:

Example 1.—4-carbamoyl-4-methyl-5-(3-hydroxyphenyl)-2-oxazolidinone

Eighty grams (0.418 mole) of L(—)-acetyl-3-hydroxyphenylcarbinol, 40.7 g. (0.625 mole) of KCN, 407 g. (3.57 moles) of $(NH_4)_2CO_3$ and 489 ml. of water are heated with stirring at 55° for 4 hours. After cooling to room temperature, 35.7 ml. (0.625 mole) of acetic acid is added followed by 1.5 liters of ethanol. The inorganic salts are filtered off and washed with ethanol. The combined filtrate and washings are taken to dryness in vacuum. The residue is dissolved in 750 ml. of isopropyl alcohol, filtered from inorganics, and concentrated in vacuum to a brown glass; weight 149 g. (greater than theory), $A\%_{2770}74$ ($CH_3OH$). The NMR spectrum indicates an 80–20 isomer ratio.

Fifty grams of crude oxazolidinone is partitioned between ethyl acetate-water in a 30-tube Craig countercurrent apparatus. The separation of isomers is determined by paper-strip chromatography. The major isomer is isolated as a glass, 28.6 g., $A\%_{2770}104$ ($CH_3OH$), $[\alpha]_D^{26}$ —53° (1%, $H_2O$). Analysis: Calc'd. for $C_{11}H_{12}O_4N_2$: C, 55.93; H, 5.12; N, 11.87. Found: C, 56.02; H, 4.99; N, 11.74.

Example 2.—L(—)-3-(3-hydroxyphenyl)-2-methylalanine

Five grams of 4-carbamoyl-4-methyl-5-(3-hydroxyphenyl)-2-oxazolidinone in 33 ml. of acetic acid is refluxed for 4 hours with 16.7 g. of 50% HI and 6.68 g. red phosphorus. Insolubles are filtered off and the filtrate is concentrated to dryness in vacuo. The residue is dissolved in 100 ml. of acetone and treated with 1.0 g. of ethylene oxide. A first crop of crude amino acid is filtered off and washed with ethanol; weight 0.85 g. Recrystallization from ethanol-water gives 0.52 g. of product, M.P. 262–264°, $A\%_{2750}105$, one spot by paper strip chromatography. Rotation measured in copper sulfate solution is +175° identical to rotation observed with L(-)-3-(3-hydroxyphenyl)-2-methylalanine obtained by resolution of synthetic D, L material.

Example 2.—L(—)-3-(3-hydroxyphenyl)-2-methylalanine

Five grams of 4-carbamoyl-4-methyl-5-(3-hydroxyphenyl)-2-oxazolidinone in 25 ml. of concentrated HCl is refluxed under nitrogen for 24 hours. The reaction mixture is concentrated to dryness in vacuum and the residue dissolved in 100 ml. acetone. Ammonium chloride is filtered off and 1.0 g. of ethylene oxide is added to the filtrate. An oil separates which subsequently crystallizes and is filtered off. The yield is 3.78 g. (84%), M.P. 217–217.5°, $A\%_{2780}102$, $[\alpha]_D^{25}$ —45° (1%, 0.1N HCl), copper salt rotation —17°.

Example 4.—L-α-methyl-3,4-dihydroxyphenylalanine

The procedures of Examples 1 and 2 are followed using the equivalent amount of L-α-acetyl-3,4-dihydroxyphenyl carbinol as the starting material in Example 1. The product, L-α-methyl-β-(3,4-dihydroxyphenyl)-alanine, has the specific rotation $[\alpha]_D^{23}$=—4°±2°.

Similar results are obtained when the corresponding α-acetyl-3,5 or 2,3-dihydroxy or 2,4,5 or 3,4,5-trihydroxyphenyl carbinols are used as starting materials, except that the correspondingly hydroxylated amino acids are obtained.

When L-α-propionyl-3,4-dihydroxyphenyl carbinol is used as the starting material, the corresponding L-α-ethyl-3,4-dihydroxyphenylalanine is obtained.

Example 5.—(2S:3R)-3-(3,4-dihydroxyphenyl)-2-methylserine

The procedures of Examples 1 and 3 are followed using an equivalent quantity of L-α-acetyl-3,4-dihydroxyphenyl carbinol as the starting material. Similar results are obtained when the corresponding α-acetyl-3,5- or 2,3-dihydroxy or 2,4,5 or 3,4,5-trihydroxyphenyl carbinols are used as the starting materials.

We claim:

1. A stereospecific method of synthesizing L-α-lower alkyl hydroxylated phenylalanines, which comprises, in combination, the steps of:
   (a) agitating an L-lower alkanoyl hydroxylated phenyl carbinol with a molecular excess of a water-soluble cyanide and ammonium carbonate in warm aqueous solution until a substantial amount of a mixture of four parts of the (4S:5R) to one part of the (4R:5R) isomers of 4-lower alkyl-4-carbamoyl-5-(hydroxylated-phenyl)-2-oxazolidinone is formed, wherein the lower alkanoyl group has from 2 to 5 carbon atoms;
   (b) isolating the (4S:5R) isomer from the isomer mixture; and
   (c) converting said (4S:5R) isomer into L-α-lower alkyl hydroxylated phenylalanine by heating said isomer to reflux with an excess of red phosphorus and hydrogen iodide in aqueous acetic acid.

2. A stereospecific method of preparing a 2S:3R-3-(hydroxylated-phenyl)-2-lower alkylserine, which comprises, in combination, the steps of:
   (a) agitating an L-lower alkanoyl hydroxylated phenyl carbinol with a molecular excess of a water-soluble cyanide and ammonium carbonate in warm aqueous solution until a substantial amount of a mixture of four parts of the (4S:5R) to one part of the (4R:5R) isomers of 4-lower alkyl-4-carbamoyl-5-(hydroxylated-phenyl)-2-oxazolidinone is formed, wherein the lower alkanoyl group has from 2 to 5 carbon atoms; and
   (b) isolating the (4S:5R) isomer from said mixture of isomers; and
   (c) refluxing said (4S:5R) oxazolidinone isomer in a concentrated hydrohalic acid in an inert atmosphere until conversion to a salt of a 3-(hydroxylated-phenyl)-2-lower alkylserine is formed.

3. A stereospecific method of synthesizing L-α-lower alkyl hydroxylated phenylalanines, which comprises, in combination, the steps of:
   (a) agitating an L-lower alkanoyl hydroxylated phenyl carbinol with a molecular excess of a water-soluble cyanide and ammonium carbonate in warm aguenous solution until a substantial amount of a mixture of four parts of the (4S:5R) to one part of the (4R:5R) isomers of 4-lower alkyl-4-carbamoyl-5-(hydroxylated-phenyl)-2-oxazolidinone is formed wherein the lower alkanoyl group has from 2 to 5 carbon atoms;
   (b) isolating said mixture by acidification, dilution with a water miscible organic liquid, removal of inorganic salts by filtration, and evaporation of the filtrate;
   (c) separating said isomeric mixture by partition between ethyl acetate and water in a counter-current extraction followed by isolation of the 4S:5R isomer by evaporation of the solvent; and
   (d) converting said isomer into L-α-lower alkyl hydroxylated phenylalanine by heating the said isomer to reflux with an excess of red phosphorus and hydrogen iodide in aqueous acetic acid.

4. A stereospecific method of synthesizing an L-α-lower alkyl hydroxylated phenylalanine, which comprises, in combination, the steps of:
   (a) agitating at 55° C. a mixture of L-lower alkanoyl hydroxylated-phenyl carbinol, a molecular excess of ammonium carbonate and water until a substantial amount of a mixture of four parts of the (4S:5R) to one part of the (4R:5R) isomers of 4-lower alkyl-4-carbamoyl-5-(hydroxylated-phenyl) - oxazolidinone is formed, wherein the lower alkanoyl group has from 2 to 5 carbon atoms;
   (b) isolating said isomeric mixture by diluting said reaction mixture with about three times its volume of ethanol and sufficient acetic acid to be a molecular equivalent to the potassium cyanide used, followed by filtration and evaporation of the filtrate;
   (c) separating said isomeric mixture by countercurrent partition between ethyl acetate and water followed by isolation of the 4S:5R isomer by evaporation of the solvent; and
   (d) heating said 4S:5R isomer to reflux with a molecular excess of red phosphorus and hydrogen iodide in aqueous acetic acid until substantial conversion to a salt of an α-lower alkyl hydroxylated phenylalanine has occurred followed by filtration, evaporation of the filtrate, dissolution of the residue in acetic acid, and addition of ethylene oxide until the free amino acid is formed.

5. The process of claim 4 in which the starting material is L-acetyl 3-hydroxyphenyl carbinol and the end product is L-α-methyl-m-tyrosine.

6. The process of claim 4 in which the starting material is L-acetyl 3,4-dihydroxyphenylalanine and the product is L-α-methyl-3,4-dihydroxyphenylalanine.

7. A stereospecific method of preparing a 2S:3R-3-(hydroxylated-phenyl)-2-lower alkylserine, which comprises, in combination, the steps of:
   (a) agitating an L-lower alkanoyl hydroxylated phenyl carbinol with a molecular excess of a water-soluble cyanide and ammonium carbonate in warm aqueous solution until a substantial amount of a mixture of four parts of the (4S:5R) to one part of the (4R:5R) isomers of 4-lower alkyl-4-carbamoyl-5-(hydroxylated-phenyl)-2-oxazolidinone is formed, wherein the lower alkanoyl group has from 2 to 5 carbon atoms;
   (b) isolating said mixture by acidification, dilution with a water miscible organic liquid, removal of inorganic salts by filtration, and evaporation of the filtrate;
   (c) separating said isomeric mixture by partition between ethyl acetate and water in a counter-current extraction followed by isolation of the 4S:5R isomer by evaporation of the solvent; and
   (d) refluxing said oxazolidinone isomer in a concentrated hydrohalic acid under an inert atmosphere until conversion to a salt of a 3-(hydroxylated-phenyl)-2-lower alkylserine is formed.

8. A stereospecific method of preparing a 2S:3R-3-(hydroxylated-phenyl)-2-lower alkylserine, which comprises, in combination, the steps of:
   (a) agitating at 55° C. a mixture of L-lower alkanoyl hydroxylated-phenyl carbinol, a molecular excess of potassium cyanide, a molecular excess of ammonium carbonate and water until a substantial amount of a mixture of four parts of the (4S:5R) to one part of the (4R:5R) isomers of 4-lower alkyl-4-carbamoyl-5-(hydroxylated-phenyl)-oxazolidinone is formed, wherein the lower alkanoyl group has from 2 to 5 carbon atoms;

(b) isolating said isomeric mixture by diluting said reaction mixture with about three times its volume of ethanol and sufficient acetic acid to be a molecular equivalent to the potassium cyanide used followed by filtration and evaporation of the filtrate;

(c) separating said isomeric mixture by countercurrent partition between ethyl acetate and water followed by isolation of the 4S:5R isomer by evaporation of the solvent; and (d) refluxing said oxazolidinone isomer in concentrated hydrochloric acid under nitrogen until a salt of said 3-(hydroxylated-phenyl)-2-lower alkylserine is formed and isolating the free amino acid by evaporation to dryness, dissolution of the residue in acetone, filtration and treatment of the filtrate with ethylene oxide.

9. The process of claim 8 in which the starting material is L-acetyl 3-hydroxyphenyl carbinol and the product is (2S:3R)-3-(3-hydroxyphenyl)-2-methylserine.

10. The process of claim 8 in which the starting material is L-acetyl 3,4-dihydroxyphenyl carbinol and the product is (2S:3R)-3-(3,4-dihydroxyphenyl)-2 - methylserine.

11. A 3-(hydroxylated-phenyl)-2-lower alkylserine.
12. A 3-(monohydroxyphenyl)-2-lower alkylserine.
13. A 3-(dihydroxyphenyl)-2-lower alkylserine.
14. 3-(3-hydroxyphenyl)-2-methylserine.
15. 3-(3,4-dihydroxyphenyl)-2-methylserine.

References Cited

UNITED STATES PATENTS 2,868,818   1/1959   Pfister et al. _____ 260—519

LORRAINE A. WEINBERGER, *Primary Examiner.*

L. A. THAXTON, *Assistant Examiner.*

UNITED STATES PATENT OFFICE
CERTIFICATE OF CORRECTION

Patent No. 3,407,226  Dated October 22, 1968

Inventor(s) J. M. Chemerda, E. W. Tristram and R. J. Tull

It is certified that error appears in the above-identified patent and that said Letters Patent are hereby corrected as shown below:

Column 4, Line 71 - Example 2 should read "Example 3" ;
Title should read "(2S:3R)-3-(3-Hydroxyphenyl)-2-methylserine"

SIGNED AND SEALED
AUG 18 1970

(SEAL)
Attest:
Edward M. Fletcher, Jr.
Attesting Officer

WILLIAM E. SCHUYLER, JR.
Commissioner of Patents